Patented Jan. 8, 1929.

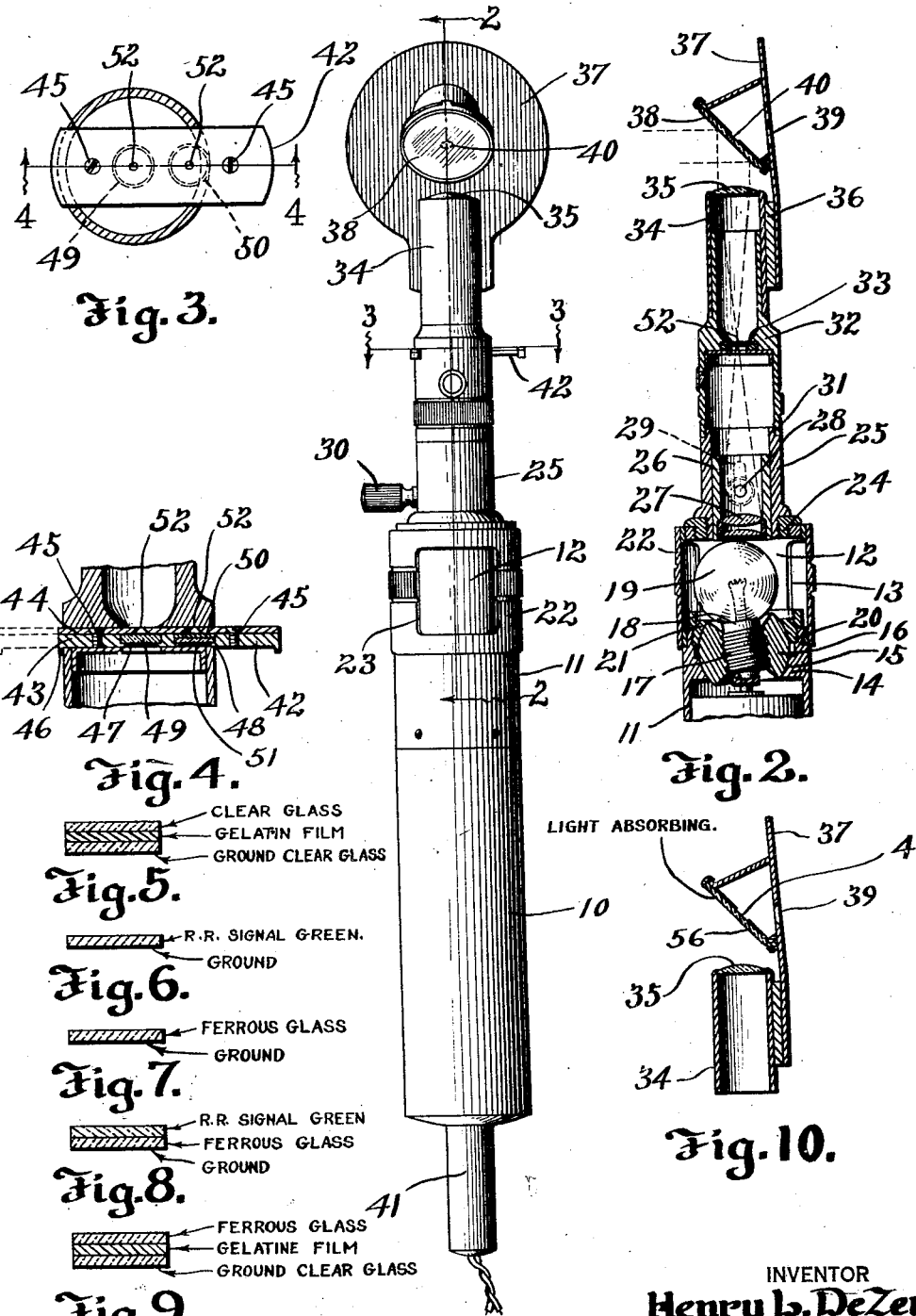

1,698,124

UNITED STATES PATENT OFFICE.

HENRY L. DE ZENG, OF GENEVA, NEW YORK, ASSIGNOR TO DE ZENG STANDARD COMPANY, OF CAMDEN, NEW JERSEY, A CORPORATION OF NEW JERSEY.

OPTICAL DIAGNOSTIC INSTRUMENT.

Application filed October 3, 1924. Serial No. 741,397.

This invention relates to improvements in diagnostic instruments, and has particular reference to an improved retinoscope for use in determining refractive errors of the eye.

The retinoscopes in use prior to my invention have been so constructed as to direct a beam of light into the patient's eye under observation, and the light used has contained practically all the light waves of the spectrum. In such prior art instruments there have been certain undesirable features which have been annoying to both the refractionist and the patient, and which have often led to inaccuracies in the final results. I have found that these objectionable features have been due to the presence of long waves, particularly the red, in the light, and that by eliminating these waves from the projected beam of light, retinoscopy is rendered more accurate and with practically no discomfort to the person examined.

The long waves penetrate the retinal tissues to a position behind the point at which the images of an observed object is located in perfect vision, while the shorter waves do not penetrate so deeply and consequently are returned from substantially the same position occupied by the image referred to, which insures a more accurate objective measurement of the refraction.

Another objectionable feature of the prior art retinoscopes has resided in the fact that they have a tendency to cause temporary visual suppression due to temporary paralysis of the retina. This is particularly noticeable following an objective test of the eye, when the light is left in the eye for any considerable length of time, or when measurements are taken close to or in the macular region. I have found that when the long waves are eliminated from the light, there is less visual suppression even after a lengthy examination. This contributes greatly to accuracy and comfort of the examination.

One of the principal objects of my invention is to provide a retinoscope with means for eliminating the longer waves from the projected light.

Another object is to provide an instrument which may be used selectively to give either red free light or clear light.

Another object is to provide an instrument which will project a beam of red free diffused light.

Still another object is to provide a device with an improved illuminating system which will give an intense concentrated illumination, and which consequently will give a reflex from substantially the same plane as that occupied by the retinal image.

Another object of the invention is to provide an instrument which will be simple in construction, strong and durable in service, accurate and efficient in use, and an improvement in the art.

With these and other objects in view, the invention resides in the novel features of construction, combination and arrangement of parts hereinafter fully set forth, illustrated in the accompanying drawings, and particularly pointed out in the appended claims.

Referring to the drawings forming a part of this application, and wherein similar reference characters designate corresponding parts throughout the several views:

Figure 1 is a front elevation of a retinoscope embodying the invention;

Figure 2 is a vertical transverse sectional view on line 2—2 of Figure 1;

Figure 3 is a horizontal sectional view on line 3—3 of Figure 1;

Figure 4 is a vertical sectional view on line 4—4 of Figure 3;

Figures 5 to 9 inclusive are detail sectional views illustrating modified constructions of light absorbing screens;

Figure 10 is a sectional view through an interchangeable mirror which may be used with the device.

In carrying out the invention the handle member 10 is provided preferably from a hard rubber or other suitable material at the upper end of which is secured a metallic sleeve 11 which in turn carries an upwardly extending cage member 12 provided with diametrically opposed openings 13. Intermediate its ends the sleeve 11 is inwardly flanged as at 14, said flange being formed into a spherical seat 15 upon which is adapted to rest a ball socket 16. The socket 16 is centrally apertured and screw-threaded as at 17 for the reception of the butt 18 of an incandescent lamp 19. The extremity of the sleeve 14 is internally threaded as at 20 for the reception of a clamping member 21 which is also internally formed in a spherical curvature to engage the outer surface of the ball socket 16 and to clamp the same against the spherical seat 15. Loosely mounted for rotation upon the cage 12 is a cover member 22 which is also provided with diametrically opposed openings 23 of the same size as the opening 13. By rotation of the cover member 22 the openings 23 may be brought into alinement with the openings 13 or they may be entirely closed as desired.

The upper end of the cage 12 carries a bushing 24 into which is screw threaded a tubular housing 25 which forms a support for the lens system of the instrument. A sleeve 26 is slidably mounted internally to the housing 25 and adapted to carry the pair of condensing lenses 27, as clearly shown in Figure 2. At one side of the sleeve 26 is a set screw 28 which operates through an elongated slot 29 of the housing 25 and said set screw has an enlarged knurled head 30 for convenient manipulation.

Attached as by a screw-threaded connection 31 to the upper end of the housing 25 is an elongated head 32 which is centrally bored in axial alinement with the housing 25 and provided intermediate of its ends with a restricted aperture 33. The upper extremity of the head 32 is formed of a reduced diameter on which is slidably mounted a sleeve 34 carrying a projection lens 35. On the rear side of the sleeve 34 is fastened in any suitable manner a plate 36 which is formed with an enlarged plate as at 37, to which is secured in any desirable manner a reflector 38. The plate 37 has a sight opening 39 which is in substantial horizontal alinement with the center of the angularly disposed reflector 38 and said reflector has a small central transparent portion 40 whereby the operator of the instrument may sight through the aperture 39 and through the reflector.

A suitable source of electric current is supplied either by a detachable plug 41 connected to a low current transformer or the handle 10 may be provided internally with a dry cell as is well known in the art.

The head 32 is transversely apertured at its restricted portion 33 and provided with a slide 42 which may be selectively positioned for use in different ways. The slide member 42 is preferably formed of a main base portion 43 and a cover plate 44 held together by suitable fastening screws 45 as best shown in Figure 4. The extremities of the base plate 43 are formed with downwardly extending ears 46, which act as stops to properly position the device. Intermediate its ends and equally spaced therefrom the slide 42 is provided with a pair of light passageways 47 and 48, in the first of which is mounted a piece of ground glass 49 or other suitable light diffusing material. Clampingly held in the opening 48 is a light filter 50 which is adapted to absorb the longer waves from the light passing through the light passageway, and a light diffusing member 51. It will be noted that the light passageways through the cover plate 44 are of a smaller area than the passages 47 and 48 and the device is so arranged in order that when the light is properly focused on these restricted openings an intense concentration illumination is obtained.

In the use of the device, the illuminating bulb 19 is first properly positioned in the socket 16 so that the center of the lamp filament is in line with the optical axis of the condensing lenses. This may be accomplished through the instrumentality of the ball socket 16 being universally adjustable and capable of locking in the adjusted position. After the lamp has been so positioned the condensing lenses 27 are moved axially to a proper position to focus the light exactly on the restricted passageways 52 as shown by dotted lines in Figure 2. If ordinary diffused light is desired for the examination the slide 42 is positioned as shown in Figure 4, so that the diffusing member 49 will be in line with the light passageway, thus diffusing light as projected from the bulb 19 through the lens system of the reflector 38. The person performing the operation then sights through the aperture 39 and transparent portion 40 of the reflector to look into the eye of the person being examined and by proper manipulation of the instrument refractive errors of the patient may be readily determined.

As has been previously pointed out, it is very frequently desirable to use a beam of light which contains no long red waves and when this is desired the slide 42 is moved to its second operative position wherein the light filter 50 and diffusing member 51 are in line with the light passageway. When these parts are in operative position the instrument projects a beam of diffused red free light which will not only be easy to the eye of the person being examined, but will eliminate errors on the part of refractionists due to the deep penetrating powers of the long or red waves.

There are a number of different ways in which the light absorbing member may be produced. For example, as shown in Figure 4, the upper disc 50 may be formed of some suitable colored or green glass, such as a railroad signal green, while the lower disc 51 is formed of ground clear glass.

Figures 5 to 9 inclusive show a number of other constructions for the screen, any one of which may be used with equally good results. For example, in Figure 5 a pair of clear glass discs 53 and 54 are mounted together and contain between them a small sheet of gelatine which has been dyed green. Of course, the color of the gelatine is important in order that the undesirable rays may be absorbed by it. I have found that this color may be obtained by the use of either of the following commercial dyes: malachite green, acid green or methyl green. Preferably the lower surface of the disc 54 is ground in order to give the proper diffusion, and the gelatine film absorbs the red rays.

In Figure 6 another modification is illustrated wherein a single disc of railroad signal green glass having a ground surface is used. The railroad signal green glass is well adapted for the absorption of the visible long waves of the spectrum, and when one surface of such a disc is ground it makes a very suitable screen for my improved instrument.

It may be found equally desirable to remove the long invisible waves of the spectrum, that is, the infra red, as well as the visible waves, and this may be accomplished by the use of a screen such as shown in Figure 7. Here a disc of ferrous glass is provided, having one of its surfaces ground to give the proper diffusion. The ferrous glass has the property of retarding the infra-red and the heat rays of the light.

As shown in Figure 8, a disc of railroad signal green may be combined with a disc of ferrous glass if desired, one of said discs having the ground surface; such a construction insures a more complete absorption of the red and infra-red rays and gives the proper amount of diffusion.

In Figure 9 is illustrated still another form of screen, wherein a ferrous glass disc and a clear glass disc having a ground surface are mounted together with a sheet of green dyed gelatine between the two.

In the previously described constructions gold plated glass may be substituted for the ferrous glass with equally good results as this gold plated glass also has the property of retarding the heat and infra-red rays.

Instead of having the light absorbing screen in the transversely movable slide, I may obtain the same result by forming one of the condensing lenses out of ferrous glass or other suitable light absorbing material, as will be readily obvious to those skilled in the art.

It is to be understood that the light filter or member for absorbing the red waves need not necessarily be used in the form of a slide as has previously been described but it may be applied in any way so long as the projected beam of light from the instrument to the patient's eye is substantially red free. Another modified form illustrative of such a possibility is illustrated in Figure 10 wherein I provide a reflector 56 which is mounted in exactly the same way as a plain reflector 38 in the first form described. The reflector 56 may be suitably colored or otherwise formed so as to have the proper light absorbing properties so that while clear light will be projected from the light passageway to the reflector 56 the beam of reflected light going to the patient's eye will be free of the red rays. In using the light absorbing reflector the slide 42 in the first construction may be entirely done away with and in that case it would be most desirable to provide an instrument with two interchangeable reflectors—1 being a clear reflector, as 38, and the second being a light absorbing reflector as at 56, both of these reflectors being mounted in the same way on a sleeve 34 so they can be readily interchanged.

From the foregoing it will be apparent that an improved retinoscope has been devised wherefrom either red free light or clear diffused light may be obtained. The device is simple in construction and easy for the refractionist to operate, the whole combination going to the elimination of error possibilities and discomfort accompanying the use of prior art instruments. Of course, it will be understood that changes may be resorted to in the minor details of construction and arrangement of parts, and I herein reserve the right to make such changes falling within the scope of the appended claims without departing from the spirit of my invention.

Having thus described my invention, I claim:

1. In an optical diagnostic instrument adapted to reflect light into a patient's eye, a source of light, a member having a light passage way leading from the source of light and adapted to direct the rays of light, a transparent light filter in the path of the light rays comprising a member having a gelatine film, a green pigment in the gelatine film adapted to retard the transmission of red rays of light and a ferrous glass member adapted to retard the passage of the infra-red rays of light.

2. For use in an optical instrument a transparent ferrous glass light filter having a transparent gelatine thereon and a green pigment in the gelatine to retard the transmission of red rays of light, the said ferrous glass being adapted by itself to retard the transmission of the infra-red rays of light.

3. In an optical diagnostic instrument adapted to reflect light into a patient's eye, a source of light, a member having a light passage way leading from the source of light and adapted to direct the rays of light, a transparent light filter in the path of the light rays comprising a member having a green pigment adapted to retard the transmission of red rays of light and a ferrous glass member adapted to retard the passage of the infra-red rays of light.

4. For use in an optical instrument a transparent ferrous glass light filter having a transparent member thereon, and a green pigment associated with said member to retard the transmission of red rays of light, the said ferrous glass being adapted by itself to retard the transmission of the infra-red rays of light.

HENRY L. DE ZENG.